United States Patent Office

3,027,339
Patented Mar. 27, 1962

3,027,339
UNSATURATED ESTERS OF AMINOTRIAZINE FORMALDEHYDE CONDENSATION PRODUCTS
Paul Zuppinger, Arlesheim, and Gustav Widmer, Basel, Switzerland, assignors to Ciba Limited, Basel, Switzerland
No Drawing. Filed Sept. 18, 1959, Ser. No. 840,815
Claims priority, application Switzerland Oct. 3, 1958
12 Claims. (Cl. 260—21)

This invention relates to aminotriazine compounds and more particularly to new unsaturated ethers of aminotriazine formaldehyde condensation products, and the production and use of said compounds.

The preparation of aminotriazine formaldehyde condensation products etherified with allyl alcohol is known. In addition, compositions which dry under oxidizing conditions, which contain such condensation products etherified with allyl alcohol and a metal drier, are known. However, condensation products etherified with allyl alcohol have the disadvantage that small quantities of allyl alcohol tend to become split off therefrom during storage. Since even minute traces of free allyl alcohol have a very irritating effect on the mucous membranes, it is necessary to take protective precautions in the application of such products. In addition, the said products have the disadvantage that they are not always compatible with other compounds drying under oxidizing conditions, such for example as drying oils.

It has now been found that these disadvantages do not arise if, instead of allyl alcohol, certain unsaturated alcohols as hereinafter set forth are employed.

According to the present invention there is provided as a new class of chemical compound the ethers of condensation products of formaldehyde with aminotriazines containing at least two amino groups, said ethers being formed with unsaturated alcohols of the general Formula I:

$$HO-R-O-CH_2-CR_1=CH-R_2 \quad (I)$$

in which R represents an organic radical, especially an aliphatic, cycloaliphatic or araliphatic hydrocarbon radical, or a said radical containing halogen substituents and/or interrupted by oxygen atoms, and $R_1$ and $R_2$ each represent a hydrogen atom or a methyl group, the said ethers containing at least one alcohol radical of the formula

per amino group of the amino triazine.

According to a further feature of the invention there is provided a process for the production of the new unsaturated ethers which comprises reacting a condensation product of formaldehyde and amino triazine containing at least two amino groups, containing per amino group of the amino triazine at least one methylol group or one methylol group etherified with a saturated aliphatic alcohol containing from 1 to 4 carbon atoms, in the presence of an etherification catalyst, such as an acid, with sufficient of an unsaturated alcohol of general Formula I that the product contains at least one alcohol radical of the formula

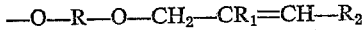

per amino group of the aminotriazine, the reaction being carried out in the presence of an etherification catalyst, e.g. an acid.

The etherification is preferably carried out at a temperature below the boiling point of the unsaturated alcohol, preferably below 100° C., and optionally in vacuo.

Formaldehyde condensation products of amino triazines containing at least two $NH_2$ groups, which are suitable for etherification with the unsaturated alcohol according to the invention, include those which contain, per amino group of the amino triazine, at least one free methylol group or one methylol group etherified with an alcohol of low molecular weight, such as methanol, and those which possess, in addition to such methylol groups, methylol groups etherified with other alcohols. Among these compounds are the reaction products of formaldehyde and melamine. Such condensation products may contain from 1 to 6 methylol groups, and they generally constitute mixtures of various compounds, including trimethylol melamine and hexamethylol melamine. Other formaldehyde-melamine condensation products are those derived from N-substituted melamines, such as N-butylmelamine, N-phenylmelamine, N-tolylmelamine, N-cyclohexylmelamine, N,N-diallylmelamine, N,N-dibenzylmelamine and N-tert.-octylmelamine. There may also be employed methylol compounds of those derivatives of melamine which also contain at least two amino groups, for example methylol compounds of melam, melem, ammeline, ammelide, of halogen-substituted aminotriazines, such as 2-chlor-4:6-diamino-1:3:5-triazine, or of amino triazines substituted by alloxy groups, such as 2-alloxy-4:6-amino-1:3:5-triazine, methylol compounds of guanamines, such as formoguanamine, acetoguanamine, n-butyroguanamine, isobutyroguanamine, methacryloguanamine, sorboguanamine, n-valeroguanamine, caproguanamine, heptanoguanamine capryloguanamine, 4-ethyl-2-octanoguanamine, stearoguanamine, linoleoguanamine, $\Delta^3$-tetra-hydrobenzoguanamine, hexahydrobenzoguanamine, 3-methyl-$\Delta^3$-tetrahydrobenzoguanamine, hexahydrobenzoguanamine, 3-methyl-$\Delta^3$-tetrahydrobenzoguanamine, 3-methylhexahydrobenzoguanamine, 3:4-dimethyl-$\Delta^3$-1:2:5:6-tetrahydrobenzoguanamine, benzoguanamine, o-, m- and p-toluguanamine, o-, m- and p-xylene guanamine, α- and β-naphthoguanamine, and diguanamines, for example those of the general formula

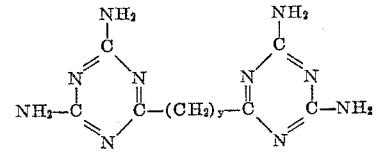

where y is a small integer, such as adipoguanamine, and tetramethylolbenzoguanamine and tetramethylolacetoguanamine.

The ethers containing alcohol residues of low molecular weight which may also be employed may be derived from the aforesaid compounds and from saturated alcohols, such as methyl alcohol, ethyl alcohol, n-propyl alcohol, isopropyl alcohol, n-butyl alcohol or isobutyl alcohol, and also from unsaturated alcohols such as allyl alcohol, methallyl alcohol and 2-buten-1-ol. For example, methyl ethers of methylol melamines containing from 3 to 6 methylol groups, in which 2 to 6 methylol groups have been etherified, may be employed.

The unsaturated alcohols of Formula I employed for the etherification or transetherification of the aminotriazine formaldehyde condensation products are di- or polyalcohols, in which a hydroxyl group has been etherified with allyl alcohol, methallyl alcohol or 2-buten-1-ol.

Examples of such dihydric and polyhydric alcohols, from which the corresponding ether alcohols of general Formula I are derived are:

Ethylene glycol, 1:2-propanediol, 1:2:4-butanetriol, 1:3-propanediol, glycerin, 1:3-butanediol, 1:4-butanediol, 1:5-pentanediol, trimethylolpropane, 2-methyl-n-pentane-2:4-diol, N-hexane-2:5-diol, 2-ethylhexane-1:3-diol, 2:4:6-hexanetriol, 2:2'-dihydroxy-di-n-propylether, diethylene glycol, triethylene glycol, higher polyethylene glycols, 1-chlorobutane-2:4-diol, 3-chloropentane-1:4-diol, glycerin-α-monochlorhydrin, glycerin-β-monochlorhydrin, 3-chlorobutane-1:2-diol, 2-bromobutane-1:3-diol, 1-chloropentane-2:5-diol, 1-chlorohexane-2:6-diol, 2-bromohexane-3:6-diol, 3-chlorohexane-1:2-diol and phenylglycol, and polyalcohols such as are obtainable by hydrolysis of polyglycidyl ethers, obtained by condensation of an epihalohydrin and a diphenol, such as resorcinol or bis-(4-hydroxyphenyl)-dimethylmethane, in alkaline medium, or of cycloaliphatic polyepoxy compounds, such as for example 6:6'-dimethyl-3:4-epoxy-hexahydrobenzyl-3':4'-epoxyhexahydrobenzoate.

Ether alcohols of general Formula I can be particularly conveniently obtained, for example, by the addition reaction of at least one mol. of an epoxide, such as styrene oxide, or more especially of an alkylene oxide containing 2 to 4 carbon atoms, for example ethylene oxide, propylene oxide or butylene oxide, with 1 mol. of allyl alcohol, methallyl alcohol or 2-buten-1-ol.

The ethers according to the invention are generally obtained as crystal-clear, transparent syrups of low viscosity and of only very slight odour. They possess the valuable property that, at room temperature, in the presence of oxygen and in the presence of driers such as cobalt compounds, e.g. cobalt naphthenate or cobalt 2-ethyl hexanate, they provide coatings which become dried and pressure-resistant after a few hours and become scratch-proof at the latest after only a few days, the layers thus formed being substantially insoluble in organic solvents and in water.

The drying process can be greatly accelerated by heating, for example at 80° C. for 1 hour. While only few metal driers can be regarded as suitable for use at room temperature, for example those of the iron group of the periodic system, i.e. iron and nickel driers in addition to cobalt driers (the two former requiring longer drying times), other known metal driers can be used at elevated temperature, more especially chromium, aluminum, calcium and zinc driers.

According to a further aspect of the present invention therefore there are provided compositions which dry under oxidizing conditions and which contain the ethers according to the invention and in addition metal driers.

An addition of peroxides, more especially of organic peroxides, such as benzoyl peroxide, di-tert.-butyl peroxide, lauryl peroxide or hydroxycyclohexylhydroperoxide, may further accelerate the drying. The drying period can be further shortened by increasing the quantity of metal drier or of peroxide.

The unsaturated ethers of formaldehyde condensation products of aminotriazines, more especially of melamine, according to the invention, are readily compatible with many binders and solvents usual in the preparation of synthetic resin masses and solutions. Their polymerization capacity and their drying property under oxidizing conditions are generally maintained even in mixtures with such binding agents and solvents. The addition of such unsaturated ethers, for example to coating masses prepared from usual binders, gives coatings or films whose hardness and gloss is generally considerably better than those of coatings obtained without the addition of the new unsaturated ethers. Moreover, better fastness to light of the coatings can often be observed. Casting, laminating, trowelling and impregnating compositions, cements, adhesives and moulding compounds can be similarly improved by the inclusion of the unsaturated ethers. Products obtained therefrom generally exhibit greater surface hardness and resistance to abrasion, and better resistance to water, organic solvents and chemical agents than products obtainable without the addition of the unsaturated ethers.

The unsaturated ethers may with advantage also be added to binders derived from air-drying oils, which in themselves respond to driers and therefore possess air-drying properties, such for example as linseed oil, dehydrated castor oil, soya bean oil, wood oil and alkyd resins or styrenated oils. It is also possible, by adding unsaturated ethers according to the invention, to obtain improvements, more especially in regard to hardness and insolubility of the coatings or films thereby produced, in the case of nitrocellulose, acetylcellulose, ethylcellulose, polyvinyl acetate, polyvinyl acetals, polystyrenes and like thermoplastic substances whose solutions dry, merely due to loss of solvent and not by themselves under oxidizing conditions in the air or on heating as in the case of the drying oils. Finally, other compounds polymerizable with peroxides, such as styrene, vinyl esters, acrylic acid esters, acrylonitrile and $\alpha,\beta$-unsaturated polyesters, may be employed in combination with such unsaturated ethers.

The quantity of unsaturated ether to be added to such compositions depends upon the properties of the other substances present and upon the requirements which must be met by the compositions in use and may therefore be varied within wide limits. Naturally, such mixtures may also contain solvents and/or modifying additions, such as plasticizers, organic or inorganic fillers or pigments.

The unsaturated ethers according to the invention may be modified by reaction with monohydric or polyhydric alcohols, such as ethylene glycol, stearyl alcohol, myricyl alcohol, linseed oil alcohol, and incompletely etherified or esterified glycerin, such for example as its partial ethers with higher fatty alcohols or partial esters with higher fatty acids, or with compounds containing carboxyl groups, such as saturated or unsaturated fatty acids and resin acids. The mixed ethers or esterified ethers thus obtained can be used for the same purposes as the unmodified unsaturated ethers and are sometimes employed with advantage instead of the latter.

In some cases, the modification of the unsaturated ethers according to the invention by condensation with $\alpha,\beta$-unsaturated compounds containing at least one group condensable with the aforesaid unsaturated ethers is particularly advantageous. As $\alpha,\beta$-unsaturated compounds which contain only one group reactable with the unsaturated methylolaminotriazine ether, compounds may be employed which contain, for example, a carboxyl, hydroxyl, acid chloride, acid amide, amino or isocyanate group. For example, $\alpha,\beta$-unsaturated monocarboxylic acids such as acrylic acid, $\alpha$-methacrylic acid, $\alpha$-styrylacrylic acid, $\alpha$-isopropylideneacrylic acid, crotonic acid, $\beta$-2-furylacrylic acid, cinnamic acid, $\alpha$-phenylcinnamic acid, $\alpha$- or $\beta$-bromocinnamic acid, $\alpha$-methylcinnamic acid, $\alpha$-ethylcinnamic acid, $\beta$-bromocrotonic acid, $\alpha$-chlorocrotonic acid, sorbic acid, 1-cyclohexene-1-carboxylic acid, $\beta$-propylacrylic acid, monoesters of $\alpha,\beta$-unsaturated dicarboxylic acids, such as maleic, fumaric, mesaconic and citraconic acids, with preferably unsaturated monohydric alcohols, such as allyl alcohol or ethylene glycol monoallyl ether, such for example as maleic acid monoallyl ester, as also polyesters produced from $\alpha,\beta$-unsaturated dicarboxylic acids and containing one carboxyl or one hydroxyl group per molecule, or polyester mixtures containing such polyesters, are also very suitable for this purpose. In addition, mono-, di- or triesters of dihydric, trihydric and tetrahydric alcohols, and $\alpha,\beta$-unsaturated monocarboxylic acids, such for example as glycol monoacrylic acid esters or glycerin diacrylic acid esters, may be employed. Acrylamide, vinyl amine, divinyl amine and acrylic acid chloride are also suitable.

As $\alpha,\beta$-unsaturated compounds containing two or more groups reactable with the unsaturated ether, such as free carboxyl, hydroxyl, acid amide or amino groups, there may be employed, for example: $\alpha,\beta$-unsaturated dicarboxylic acids, such as maleic acid, fumaric acid, mesaconic acid or citraconic acid, their anhydrides or amides, and also esters, containing at least two free hydroxyl groups, of $\alpha,\beta$-unsaturated monocarboxylic acids and polyhydric alcohols, such as glycerin mono- or pentaerythritol diacrylic acid esters, and reaction products containing amino- and/or carboxyl groups of α,β-unsaturated dicarboxylic acids and diamines, such as ethylene diamine, propylene diamine, butylene diamine or hexamethylene diamine, and also the readily accessible esters or ester mixtures, containing at least two carboxyl and/or hydroxyl groups, of α,β-unsaturated dicarboxylic acids and polyhydric alcohols, such as glycol, propylene glycol, butylene glycol, glycerin or pentaerythritol.

The reaction of the new unsaturated ethers with the α,β-unsaturated compounds is effected simply by heating the mixture of the reaction components advantageously in the presence of a polymerization stabilizer such as hydroquinone, until shortly before gelation occurs, volatile fractions, such as water and lower alcohol, being removed, if desired, under reduced pressure.

Instead of the condensation products, mixtures of the unsaturated ethers according to the invention and the α,β-unsaturated compounds, such as more especially polyesters of α,β-unsaturated dicarboxylic acids and polyhydric alcohols, may in some cases be employed with equally good success.

For coatings which are to dry in the air at room temperature, products are advantageously employed which are substantially etherified with the unsaturated ether alcohol of Formula I, while products etherified to a small extent, which harden rapidly on heating, are suitable for oven drying.

Coatings, films and like products obtained merely by drying in the air, at room temperature or in an oven, the unsaturated ethers in association with a cobalt drier are generally odourless, crystal-clear, insoluble in organic solvents, water-resistant and light-fast and have high final hardnesses, depending upon their structure. Their drying time in the air can be considerably reduced by pre-polymerizing the starting products, for example by blowing with air at 150° C., whereby their viscosity is increased. An addition of peroxidic catalysts, although these alone have little activity, may substantially decrease the drying time in the presence of, for example, cobalt drier.

When employing lacquer solutions which contain the unsaturated ethers according to the invention in admixture and/or modified with α,β-unsaturated polyesters, and in addition in combination with polymerizable compounds, such as styrene, the drying time of the lacquer films obtained may additionally be shortened in known manner by the addition of waxy substances, such as paraffin. If the waxy substances employed are salts of higher fatty acids and drier metals, such for example as Co-, Mg-, Ca-, Pb-, Fe-, Ni-, Zn-, or Al-palmitate, stearate or montanate, these substances at the same time act as driers and as an additive for increasing the ability of the coatings to be polished.

By the addition of inhibitors, such as methylene blue and more especially small quantities of copper salts, the storage stability under heat of the uncatalyzed lacquer solutions according to the invention, as also the pot-life of such catalyzed lacquer solutions, can furthermore be considerably increased without any detrimental effect on the drying times of the resultant lacquer films.

The following examples will serve to illustrate the invention. Unless otherwise stated, the parts therein are by weight and the percentages are by weight.

*Example 1*

78 parts of a hexamethylol-melaminehexamethyl ether, prepared by etherification of hexamethylol-melamine with methylalcohol and hydrochloric acid, in accordance with the procedure prescribed in Helvetica Chimica Acta, vol. XXIV, page 317E, are transetherified for 2½–3 hours, with an addition of 0.885 part of phthalic acid anhydride, by means of 154 parts of ethyleneglycol-monoallyl ether (the preparation of which is hereinafter described) with good stirring at an internal temperature of about 140° C., the vacuum gradually being increased to a maximum of 18 mm. Hg, so that 38 parts of methyl alcohol distill over. There are obtained 194 parts of a crystal-clear etherification product of low viscosity and weak odour, which, on addition of 0.16% of cobalt calcilated as metal, in the form of a 10% solution of Co-octoate in toluene, dries within 6 hours at 20° C., and at a relative humidity of 65%, to form a clear, high-lustre lacquer film, which in a layer thickness of 100μ has a Sward hardness of about 50 after 14 days.

The ethylene-glycol monoallyl ether is prepared as follows:

To 1 mol. of allyl alcohol (anhydrous) is added 0.5 part of sodium metal and 0.5 mol. of ethylene oxide is introduced at about 60° C. The sodium alcoholate formed is converted into sodium carbonate with sodium bicarbonate, and the reaction mixture is subjected to fractional distillation, the fraction between 150° and 170° C. being separated off as ethylene-glycol monoallyl ether, identified by the fact that its Br number and its OH number are about 1565 and 550 respectively.

*Example 2*

The procedure of Example 1 is followed, but 175 parts of triethylene glycol-monoallyl ether (B.P.=218–220° C.; bromine value=841; hydroxyl value=295) are employed instead of ethylene glycol-monoallyl ether. There is obtained a lacquer film which dries in the air on addition of cobalt drier (0.16% cobalt metal in the form of the octoate) and which in a film thickness of 100μ has a Sward hardness of 25 after 14 days.

*Example 3*

To 675 parts of the hexamethylol-melaminehexamethyl ether described in Example 1 are added 720 parts of a mixture of glycol monoallyl ethers (obtained in accordance with Example 1 by reaction of allyl alcohol with ethylene oxide, but the unreacted excess of allyl alcohol merely being distilled off), 72 parts of maleic acid anhydride are then added, and the procedure of Example 1 is then followed. In addition to 257 parts of distillate, 1210 parts of reaction product are obtained, which product, on addition of cobalt drier (0.16% of cobalt metal), dries in the air to form a drying coating of good quality.

*Example 4*

75 parts of the hexamethylol-melaminehexamethyl ether described in Example 1 are reacted with 75 parts of a reaction product of 1 mol. of allyl alcohol with 1 mol. of epichlorhydrin, the preparation of which will hereinafter be described, with stirring and under an increasing vacuum, for 4 hours at 130–140° C., 21 parts of volatile fractions distilling over.

There are obtained 129 parts of an etherification product of weak odour, which, on addition of cobalt drier (0.16% of cobalt metal in the form of the octoate), dries overnight to form a dust-dry coating and after 2 days in a thin layer to form a scratch-resistant film. Wrinkles form in a thick layer.

Glycerin chlorhydrin allyl ether is obtained by adding to 1 mol. of allyl alcohol 0.65 part of boron fluoride dihydrate ($BF_3 \cdot 2H_2O$) and slowly adding drop-by-drop one mol. of epichlorhydrin with good stirring within 1 hour 40 minutes, so that the reaction temperature does not exceed 100° C. Ammonia gas is then introduced for a short time to form the boron fluoride-ammonia complex and the excess of allyl alcohol is distilled off in vacuo. The allyl ether remaining the flask is then filtered and thereafter used for the above-described reaction.

*Example 5*

75 parts of the hexamethylol-melaminehexamethyl ether described in Example 1 are reacted at 75° C. for 1½ hours under a constantly increasing vacuum with 75 parts of a reaction product of 1 mol. of allyl alcohol with 1 mol. of diglycidyl ether of bis-(4-hydroxyphenyl)-dimethylmethane (the preparation of which is hereinafter described), so that 5 parts of volatile fractions distill over. After the addition of cobalt drier in the form of the octoate, as in Example 4, a lacquer coating is obtained, which dries over-night to form a dust-dry coating, and after 2 days, in a thin layer, forms a scratch-resistant film. Wrinkles form when the layer is thick.

The product of reaction of allyl alcohol with glycidyl ether is prepared as follows:

To 174 parts of allyl alcohol are added 1.7 parts of boron fluoride dihydrate ($BF_3.2H_2O$), and a solution of 172 parts of an epoxy resin (epoxide content=5.1 mol. of epoxide equivalent per kg.) dissolved in 172 parts of dioxan, the said epoxy resin consisting substantially of the diglycidyl ether of bis-(4-hydroxyphenyl)-dimethylmethane (prepared by alkaline condensation of epichlorhydrin and bis-(4-hydroxyphenyl)-dimethylmethane), are introduced drop-by-drop, so that the reaction temperature does not exceed 50° C. The excess of allyl alcohol and dioxan is distilled off in vacuo at an external temperature of 100° C. There are obtained 228 parts of allyl ether, which is thereafter employed for the above-described reaction.

*Example 6*

200 parts of unsaturated polyester A, the preparation of which is hereinafter described, are well mixed at 70° C., with good stirring, with 100 parts of the reaction product prepared in accordance with Example 3 from glycol-monoallyl ether and hexamethylol-melamine-hexamethyl ether, and 4.5 parts of a 20% solution of acetobutyrate in butylacetate and 95 parts of monomeric styrene (stabilized with 200 mg. of tert. butylcatechol per kg.) are added to the mixture, which is then allowed to cool.

20 parts of the mixture obtained are then well mixed with 5.4 parts of monomeric styrene (stabilized with 20 mg. of tert.-butylcatechol per kg.). The mixture is then catalyzed with 1.2 parts of a solution of cobalt octoate in butylacetate (containing 2% of cobalt metal) and 0.6 part of tert.-butylhydroperoxide (75%). When this lacquer solution is sprayed or poured onto a glass plate, lacquer coatings are obtained, which are completely dust-dry within 1 hour at 20° C., can be well buffed and polished after a further 6 to 8 hours and are very resistant to solvents. The pot-life of the catalyzed lacquer solution is 45–50 minutes. A similar product is obtained if there are added as drier, in addition to the 1.2 parts of cobalt octoate solution, 1.2 parts of a solution of calcium octoate in butyl acetate (containing 2% of calcium metal).

The mass is very thoroughly hardened after 1 day even in the thickest layers. Lacquer coatings having similar properties are obtained if, instead of the trans-etherification product according to Example 3, a similar quantity of the transetherification product described in Example 4 is employed.

Unsaturated polyester A is obtained by esterifying 1 mol. of fumaric acid, 2 mol. of phthalic acid anhydride, 2 mol. of ethylene glycol and 0.275 mol. of benzyl alcohol at a maximum internal temperature of 220° C. with good stirring, while passing nitrogen therethrough, until the acid number amounts to 30.

*Example 7*

240 parts of unsaturated polyester B (the preparation of which is hereinafter described) are well mixed at 70° C., with good stirring, with 150 parts of the trans-etherification product prepared in accordance with Example 3, 6 parts of a 20% solution of acetobutyrate in butyl acetate and 124 parts of monomeric styrene (stabilized with 200 mg. of tert.-butylcatechol per kg.) are added thereto, and the mixture is allowed to cool.

20 parts of the mixture obtained are catalyzed as described in Example 6, and the lacquer solution is sprayed or poured onto glass plates.

Lacquer coatings are obtained, which are thoroughly dust-dry after 1 to 2 hours at 20° C., are scratch-proof after a further 6 to 10 hours, and are extremely resistant to organic solvents.

The pot-life of the catalyzed lacquer solutions is about 30 minutes. The mass is thoroughly hardened after 1 day even in the thickest layers.

Unsaturated polyester B is obtained by reacting 1 mol. of maleic acid anhydride, 1 mol. of adipic acid and 2.1 mol. of glycol in the manner described in Example 6 with reference to the preparation of polyester A.

*Example 8*

By following a similar procedure to that of Example 5, but employing, instead of polyester A, an equal quantity of polyester C as hereinafter described, there are obtained lacquer coatings which have similar properties to the lacquer films described in Example 7, except that such coatings are dust-dry within 1 hour at 20° C.

Polyester C is obtained by reacting together 1.5 mol. of fumaric acid, 1.5 mol. of phthalic acid anhydride, 3 mol. of diethylene glycol and 0.275 mol. of benzyl alcohol, as described in Example 6 with reference to the preparation of polyester A.

If the above-prepared uncatalyzed mixture of 100 parts of transetherification product according to Example 3, 200 parts of polyester C, 4.5 parts of 20% solution of acetobutyrate in butyl acetate and 95 parts of monomeric styrene (stabilized with 200 mg. of tert.-butylcatechol per kg.) are in addition mixed with:

a ------------------ [1] 1    c ------------------ [1] 25
b ------------------ [1] 10   d ------------------ [1] 50

[1] Parts of copper per million parts (p.p.m.) of the above mixture, in the form of copper naphthenate.

there are obtained products which are stable when stored at 60° C. and which can be kept without gelatinizing for 14 days and up to 1 month; the same mixture without the copper addition commences to gelatinize after about 16 hours.

If the above mixtures *a* to *d* are diluted in accordance with the particulars in Example 6 with monomeric styrene (stabilized with 20 mg. of tert.-butylcatechol per kg.) and are catalyzed as in Example 6, the pot-life of such catalyzed lacquer solutions to which copper has been added is substantially improved, as is apparent from the following table, while the good dust-drying time is maintained:

| Lacquer-mixture | p.p.m. Cu | Pot-Life, min. |
|---|---|---|
| Unmodified | — | 25 |
| a | 1 | 30 |
| b | 10 | 35 |
| c | 25 | 50 |
| d | 50 | 75 |

*Example 9*

200 parts of polyester A as described in Example 6 are mixed with 100 parts of the transetherification product according to Example 3.

The mixture is then adjusted to a dry content of 75% with monomeric styrene (stabilized with 200 mg. of tert.-butylcatechol per kg.) and catalyzed with 3% of methylethyl ketone hydroperoxide (100% and further with, in each instance):

(1) 0.08% of cobalt metal (in the form of the stearate)
(2) 0.08% of cobalt metal (in the form of the stearate) 2.5% of zinc stearate
(3) 0.08% of cobalt metal (in the form of the stearate) and
3.0% of aluminum tristearate
(4) 0.08% of cobalt metal (in the form of the stearate), 1.5% of zinc stearate, and
1% of aluminum tristearate.

By spraying the catalyzed lacquer solutions 1 to 4, coatings having the following properties are obtained:

| Catalyzed lacquer solution | Drying time in min. | Assessment after 7 hours |
|---|---|---|
| 1 | 45 | dry. |
| 2 | 95 | dry. |
| 3 | 35 | dry. |
| 4 | 30 | dry. |

*Example 10*

To 102.4 parts of a tetramethylolbenzoguanamine (the preparation of which is hereinafter described) are added 510 parts of ethylene-glycol monoallylether, the preparation of which has been described in Example 1, and 37 parts of concentrated hydrochlorid acid, and the mixture is allowed to react for 1 hour 10 minutes at 25° C. with good stirring. The hydrochloric acid is then neutralized by the addition of calcined sodium carbonate.

The common salt formed is then filtered off and the excess of ethylene glycol monoallylether is distilled off under a vacuum of about 18 mm. Hg and at 70–105° C. There are obtained 180 parts of a colorless etherification product of low viscosity and weak odour, having a bromine number of 986.5. After the addition of cobalt octoate as drier, as in Example 1, there is obtained a lacquer film which dries after 14 hours to form a clear high-lustre coating and which in a layer thickness of 35μ has a Persoz hardness of 367 after 14 days.

Tetramethylolbenzoguanamine is prepared as follows: 187.2 parts of benzoguanamine are dissolved in 440 parts of 30% aqueous formaldehyde solution, the pH of which has been adjusted to 9.6 with 4.9 parts by volume of 10% NaOH, at 80–87° C. with good stirring within 10 minutes. After 1 hour, the volatile fractions, such as water and excess formaldehyde, are removed within ¾ of an hour at 60° C. and under a vacuum of about 18 mm. Hg.

The product is then dried for 15 hours at 90° C. in a vacuum drying oven (18 mm. Hg), whereby 302 parts of tetramethylolbenzoguanamine are obtained.

*Example 11*

By following a similar procedure to that of Example 10, but employing, instead of tetramethylolbenzoguanamine, 81.5 parts of tetramethylolacetoguanamine, which has been prepared in accordance with the procedure of Example 10 for the preparation of tetramethylolbenzoguanamine from acetoguanamine and formaldehyde solution, there are obtained 151 parts of a slightly reddish etherification product of weak odour having a bromine number of 928.3, which commences to crystallize after a short time and is readily soluble in a 1:1 mixture of water and alcohol. After the addition of cobalt octoate as drier, as in Example 1, a lacquer film is obtained, which is dust-dry and scratch-resistant within 2 hours at 120° C. If hardening is effected merely at room temperature, a coating is obtained which has reached maximum hardness after 15 days with a layer thickness of 30–25μ, the Persoz hardness being 317.

*Example 12*

195 parts of the hexamethylolmelaminehexamethyl ether described in Example 1 are transetherified for 7 hours with good stirring with 2.2 parts of phthalic acid anhydride and 348 parts of propylene glycol monoallyl ether (the preparation of which is hereinafter described) at an internal temperature of about 130° C. and with a gradual increase of the vacuum to a maximum of 18 mm. Hg, so that 144 parts of volatile constituents, including 96 parts of methyl alcohol, distill off. There are obtained 396 parts of a crystal-clear etherification product of low viscosity and of weak odour, which has a bromine number of 975.

After the addition of cobalt octoate as drier, as in Example 1, a coating is obtained which is dust-dry after 14 hours at room temperature, and which in a layer thickness of 65μ has a Persoz hardness of 115 after 14 days.

Propyleneglycol monoallyl ether is prepared as follows:

To 580 parts (10 mol.) of anhydrous allyl alcohol are added 5 parts of metallic sodium, and 320 parts (5.5 mol.) of propylene oxide are then added at 25° C. The mixture is then heated until it boils under reflux, and is allowed to react for 3 hours. The sodium alcoholate is then converted into sodium carbonate by means of sodium bicarbonate and the reaction mixture is subjected to fractional distillation, the fraction boiling between 130° to 152° C., which consists of propylene glycol monoallyl ether identified by the bromine number and the OH number, which are 1377 and 483 respectively, being separated off.

*Example 13*

97.5 parts of the hexamethylolmelamine-hexamethyl ether described in Example 1, with an addition of 1.1 parts of phthalic acid anhydride, are transetherified for 6 hours with stirring with 210 parts of propylene glycol monomethyl ether (the preparation of which is hereinafter described), at 130° C. and with a gradual increase of the vacuum to a maximum of 18 mm. Hg, so that 95 parts of volatile fractions, including 48 parts of methyl alcohol, distill off. There are obtained 213 parts of a crystal-clear etherification product of weak odour at low viscosity, which has a bromine number of 965.

After the addition of cobalt octoate as drier, as in Example 1, there is obtained a coating which is dry after 14 hours at room temperature, and which in a layer thickness of 55μ has a Persoz hardness of 95 after 25 days.

Propylene glycol monomethallyl alcohol is obtained as follows:

To 720 parts (10 mol.) of anhydrous methallyl alcohol are added 5 parts of metallic sodium, whereafter 290 parts (5 mol.) of propylene oxide are added at 25° C. The mixture is then heated until it boils under reflux, and is allowed to react for 4 hours. The reaction mixture is then worked up as in Example 12, the fraction boiling between 150° and 164° C., which consists of propylene glycol monomethallyl ether identified by the bromine number and the OH number, which are 1230 and 430 respectively, being separated off.

*Example 14*

39.0 parts of the hexamethylolmelamine-hexamethyl ether described in Example 1, with an addition of 0.44 part of phthalic acid anhydride, are transetherified for 2 hours 20 minutes with 89 parts of a product of reaction of styrene oxide with allyl alcohol (phenyl glycol allyl ether) (the preparation of which is hereinafter described) with stirring at 145° C. and with gradual increase in the vacuum to a maximum of 18 mm. Hg, 13 parts of volatile fractions distilling over. There are obtained 116 parts of a crystal-clear etherification product of weak odour and low viscosity, which has a bromine number of 669. After the addition of cobalt octoate as drier, as in Example 1, a coating is obtained which is dust-dry within 1 hour at 120° C. and in a layer thickness of 50μ has a Persoz hardness of 193.

The product of reaction of styrene oxide with allyl alcohol (phenylglycol allyl ether) is obtained as follows:

240 parts of styrene oxide are heated under reflux for 16 hours with 232 parts of allyl alcohol, in which 2 parts of metallic sodium have been previously dissolved. The sodium alcoholate formed is then converted into sodium carbonate with sodium bicarbonate, and the reaction mixture is subjected to fractional distillation, the fraction which boils at a pressure of 2.0–0.3 mm. Hg between 125 and 167° C., and which consists of phenyl glycol monoallyl ether, identified by the bromine number and the OH number being 889 and 315 respectively, separating off.

Example 15

The procedure of Example 14 is followed, but there is employed, instead of phenyl glycol ether, 78 parts of the reaction product of propylene oxide with 2-buten-1-ol (propylene glycol-2-buten-1-ol-ether) (the preparation of which is hereinafter described). There are obtained 65 parts of a crystal-clear reaction product of medium viscosity and weak odour, having a bromine number of 834.

After the addition of cobalt octoate as drier, as in Example 1, a coating is obtained which is dust-dry after 14 hours at room temperature and is scratch-resistant (in a thin layer, about 5μ) after 3 days.

The product of reaction of propylene oxide with 2-buten-1-ol is obtained as follows:

116 parts of propylene oxide are heated under reflux for 6 hours with 288.4 parts of 2-buten-1-ol, in which 2 parts of metallic sodium have previously been dissolved, and the sodium alcoholate formed is then converted into sodium carbonate with sodium bicarbonate and the reaction mixture is subjected to fractional distillation. The fraction which boils between 168° and 178° C. and which consists of propylene glycol-2-buten-1-ol ether having bromine and OH numbers of about 1230 and 432 respectively, is separated.

What is claimed is:

1. Ethers of condensation products of formaldehyde with aminotriazines containing at least 2 amino groups, said ethers being formed with unsaturated alcohols of the general formula:

$$HO-R-O-CH_2-CR_1=CH-R_2$$

in which R represents a divalent radical selected from the class consisting of aliphatic hydrocarbon radicals, halogen substituted aliphatic hydrocarbon radicals, aliphatic hydrocarbon radicals interrupted by oxygen atoms, araliphatic hydrocarbon radicals, halogen substituted araliphatic hydrocarbon radicals and cycloaliphatic radicals, and $R_1$ and $R_2$ each are selected from the class consisting of a hydrogen atom and a methyl group, the said ethers containing at least one alcohol radical of the formula:

$$-O-R-O-CH_2-CR_1=CH-R_2$$

wherein R, $R_1$ and $R_2$ having the above-defined meanings, per amino group of the amino triazine.

2. Ethers of condensation products of melamine with formaldehyde, said ethers being formed with unsaturated alcohols of the general formula $$HO-R-O-CH_2-CR_1=CH-R_2$$

in which R represents a divalent radical selected from the class consisting of aliphatic hydrocarbon radicals, halogen substituted aliphatic hydrocarbon radicals, aliphatic hydrocarbon radicals interrupted by oxygen atoms, araliphatic hydrocarbon radicals, halogen substitued araliphatic hydrocarbon radicals and cycloaliphatic radicals, and $R_1$ and $R_2$ each are selected from the class consisting of a hydrogen atom and a methyl group, the said ethers containing at least one alcohol radical of the formula:

$$-O-R-O-CH_2-CR_1=CH-R_2$$

wherein R, $R_1$ and $R_2$ have the above-defined meanings, per amino group of the amino triazine.

3. Ethers of condensation products of benzoguanamine with formaldehyde, said ethers being formed with unsaturated alcohols of the general formula:

$$HO-R-O-CH_2-CR_1=CH-R_2$$

in which R represents a divalent radical selected from the class consisting of aliphatic hydrocarbon radicals, halogen substituted aliphatic hydrocarbon radicals, aliphatic hydrocarbon radicals interrupted by oxygen atoms, araliphatic hydrocarbon radicals, halogen substituted araliphatic hydrocarbon radicals and cycloaliphatic radicals, and $R_1$ and $R_2$ each are selected from the class consisting of a hydrogen atom and a methyl group, the said ethers containing at least one alcohol radical of the formula $$-O-R-O-CH_2-CR_1=CH-R_2$$

wherein R, $R_1$ and $R_2$ have the above-defined meanings, per amino group of the amino triazine.

4. Ethers of condensation products of formaldehyde with aminotriazines containing at least two amino groups, said ethers being formed with unsaturated alcohols which are condensation products of allyl alcohol and an alkylene oxide containing from 2 to 4 carbon atoms, the said ethers containing at least one alcohol radical of said unsaturated alcohol.

5. Ethers according to claim 1, which are derived from ethylene glycol-mono-allyl ether as the unsaturated alcohol.

6. A composition of matter which is self-drying under oxidizing conditions and which comprises (A) an ether of a condensation product of formaldehyde with an aminotriazine containing at least 2 amino groups, said ether being formed with an unsaturated alcohol of the general formula $$HO-R-O-CH_2-CR_1=CH-R_2$$

in which R represents a divalent radical selected from the class consisting of aliphatic hydrocarbon radicals, halogen substituted aliphatic hydrocarbon radicals, aliphatic hydrocarbon radicals interrupted by oxygen atoms, araliphatic hydrocarbon radicals, halogen substituted araliphatic hydrocarbon radicals and cycloaliphatic radicals, and $R_1$ and $R_2$ each are selected from the class consisting of a hydrogen atom and a methyl group, the said ether containing at least one alcohol radical of the formula $$-O-R-O-CH_2-CR_1=CH-R_2$$

wherein R, $R_1$ and $R_2$ have the above-defined meanings, per amino group of the amino triazine, and (B) a metal drier.

7. A composition as claimed in claim 6, wherein the metal drier is a cobalt drier.

8. A composition of matter which is self-drying under oxidizing conditions and which comprises (A) an ether of a condensation product of formaldehyde with an aminotriazine containing at least 2 amino groups, said ether being formed with an unsaturated alcohol of the general formula $$HO-R-O-CH_2-CR_1=CH-R_2$$

in which R represents a divalent radical selected from the class consisting of aliphatic hydrocarbon radicals, halogen substituted aliphatic hydrogen radicals, aliphatic hydrocarbon radicals interrupted by oxygen atoms, araliphatic hydrocarbon radicals, halogen substituted araliphatic hydrocarbon radicals, and cycloaliphatic radicals, and $R_1$ and $R_2$ each are selected from the class consisting of a hydrogen atom and a methyl group, the said ether containing at least one alcohol radical of the formula $$-O-R-O-CH_2-CR_1=CH-R_2$$

wherein R, $R_1$ and $R_2$ have the above-defined meanings, per amino group of the amino triazine, (B) a metal drier, and (C) an organic peroxide.

9. A composition of matter which is self-drying under oxidizing conditions and which comprises (A) an ether of a condensation product of formaldehyde with an aminotriazine containing at least 2 amino groups, said ether being formed with an unsaturated alcohol of the general formula $$HO-R-O-CH_2-CR_1=CH-R_2$$

in which R represents a divalent radical selected from the class consisting of aliphatic hydrocarbon radicals, halogen substituted aliphatic hydrocarbon radicals, aliphatic hydrocarbon radicals interrupted by oxygen atoms, araliphatic hydrocarbon radicals, halogen substituted araliphatic hydrocarbon radicals and cycloaliphatic radicals, and $R_1$ and $R_2$ each are selected from the class consisting of a hydrogen atom and a methyl group, the said ether containing at least one alcohol radical of the formula $$-O-R-O-CH_2-CR_1=CH-R_2$$

wherein R, $R_1$ and $R_2$ have the above-defined meanings, per amino group of the amino triazine,
(B) a metal drier,
(C) an organic peroxide, and
(D) a polymerizable ethylenically unsaturated monomeric compound.

10. A composition as claimed in claim 9, wherein the monomeric compound is styrene.

11. A composition of matter which is self-drying under oxidizing conditions and which comprises
(A) an ether of a condensation product of formaldehyde with an aminotriazine containing at least 2 amino groups, said ether being formed with an unsaturated alcohol of the general formula $$HO-R-O-CH_2-CR_1=CH-R_2$$

in which R represents a divalent radical selected from the class consisting of aliphatic hydrocarbon radicals, halogen substituted aliphatic hydrocarbon radicals, aliphatic hydrocarbon radicals interrupted by oxygen atoms, araliphatic hydrocarbon radicals, halogen substituted araliphatic hydrocarbon radicals and cycloaliphatic radicals, and $R_1$ and $R_2$ each are selected from the class consisting of a hydrogen atom and a methyl group, the said ether containing at least one alcohol radical of the formula $$-O-R-O-CH_2-CR_1=CH-R_2$$

wherein R, $R_1$ and $R_2$ have the above-defined meanings, per amino group of the amino triazine,
(B) a metal drier,
(C) an organic peroxide,
(D) styrene and
(E) an $\alpha,\beta$-unsaturated polyester.

12. A composition as claimed in claim 11, which contains in addition a waxy substance.

References Cited in the file of this patent

UNITED STATES PATENTS

| | | |
|---|---|---|
| 2,448,338 | Widmer et al. | Aug. 31, 1948 |
| 2,794,008 | Ginsler | May 28, 1957 |

FOREIGN PATENTS

| | | |
|---|---|---|
| 749,112 | Great Britain | May 16, 1956 |